United States Patent
Sugimoto

(10) Patent No.: US 10,641,308 B2
(45) Date of Patent: May 5, 2020

(54) FASTENER

(71) Applicant: PIOLAX, INC., Yokohama-shi (JP)

(72) Inventor: Naoki Sugimoto, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 327 days.

(21) Appl. No.: 15/742,781

(22) PCT Filed: Jul. 23, 2015

(86) PCT No.: PCT/JP2015/071006
§ 371 (c)(1),
(2) Date: Jan. 8, 2018

(87) PCT Pub. No.: WO2017/013797
PCT Pub. Date: Jan. 26, 2017

(65) Prior Publication Data
US 2018/0209464 A1    Jul. 26, 2018

(51) Int. Cl.
*F16B 21/08* (2006.01)
*F16B 19/00* (2006.01)
(Continued)

(52) U.S. Cl.
CPC .......... *F16B 21/086* (2013.01); *F16B 19/004* (2013.01); *F16B 21/065* (2013.01);
(Continued)

(58) Field of Classification Search
CPC ...... F16B 5/0642; F16B 5/065; F16B 19/004; F16B 21/065; F16B 21/086;
(Continued)

(56) References Cited

U.S. PATENT DOCUMENTS 2,560,961 A * 7/1951 Knohl .................. F16B 37/122
411/173
3,093,874 A * 6/1963 Rapata .................. F16B 37/043
411/508
(Continued)

FOREIGN PATENT DOCUMENTS

CN    101356379 A    1/2009
CN    101566184 A    10/2009
(Continued)

OTHER PUBLICATIONS

English Translation of PCT Form PCT/IPEA/409 in PCT/JP2015/071006, dated Aug. 23, 2017 (Japanese version previously submitted on Jan. 8, 2018).
(Continued)

*Primary Examiner* — Roberta S Delisle
(74) *Attorney, Agent, or Firm* — McGinn I.P. Law Group, PLLC.

(57) ABSTRACT

A fastener to be inserted into a holding hole of a mounted member and a mounting hole of a mount member, includes a head portion disposed on the mounting hole. A leg portion extends from the head portion to be inserted into the holding hole and the mounting hole. An engaging portion is provided on the leg portion to be brought into engagement with the mounting hole. An elastic projecting portion projects outwards of the leg portion. The elastic projecting portion is disposed away from the holding hole. The elastic projecting portion is brought into abutment with an inner circumference of the mounting hole to thereby be bent, and a largest outside diameter of a portion of the elastic projecting portion which is positioned on the rear side of the mounting hole is set to be equal to or smaller than a bore diameter of the mounting hole.

11 Claims, 10 Drawing Sheets

(51) Int. Cl.
*F16B 21/06* (2006.01)
*F16B 5/06* (2006.01)
*F16B 1/00* (2006.01)

(52) U.S. Cl.
CPC ............. *F16B 5/0642* (2013.01); *F16B 21/08* (2013.01); *F16B 2001/0092* (2013.01)

(58) Field of Classification Search
CPC ............. F16B 2001/0092; F16B 21/08; Y10S 411/913; Y10T 24/42; Y10T 24/309
USPC .......................................... 411/508, 509, 510
See application file for complete search history.

(56) References Cited

U.S. PATENT DOCUMENTS

| | | | | |
|---|---|---|---|---|
| 3,130,822 | A * | 4/1964 | Meyer | F16B 5/123 24/297 |
| 3,205,546 | A * | 9/1965 | Nelson | F16B 5/125 24/292 |
| 3,869,958 | A * | 3/1975 | Murayama | F16B 21/076 411/15 |
| 4,312,614 | A * | 1/1982 | Palmer | F16B 19/1081 24/297 |
| 4,810,147 | A * | 3/1989 | Hirohata | F16B 21/02 174/138 D |
| 5,028,187 | A * | 7/1991 | Sato | F16B 19/1081 411/48 |
| 5,797,714 | A * | 8/1998 | Oddenino | B60R 13/0206 411/508 |
| 6,715,185 | B2 * | 4/2004 | Angellotti | F16B 5/065 24/297 |
| 7,018,152 | B2 * | 3/2006 | Arisaka | F16B 19/1081 24/452 |
| 7,878,749 | B2 * | 2/2011 | Edland | F16B 21/086 24/297 |
| 8,347,465 | B2 * | 1/2013 | Arisaka | F16B 19/1081 24/297 |
| 8,601,647 | B2 * | 12/2013 | Hasegawa | F16B 21/086 24/297 |
| 8,671,527 | B2 * | 3/2014 | Scroggie | F16B 5/0642 24/297 |
| 8,936,420 | B2 * | 1/2015 | Scroggie | F16B 5/065 411/45 |
| 10,385,901 | B2 * | 8/2019 | Steltz | F16B 5/0642 |
| 2007/0253796 | A1 | 11/2007 | Kawai | |
| 2009/0022567 | A1 | 1/2009 | Huet | |
| 2015/0283884 | A1 | 10/2015 | Machida | |

FOREIGN PATENT DOCUMENTS

| | | |
|---|---|---|
| CN | 102575702 A | 7/2012 |
| CN | 202580310 U | 12/2012 |
| CN | 202732598 U | 2/2013 |
| CN | 104755294 A | 7/2015 |
| JP | 07-042717 A | 2/1995 |
| JP | 2003-206914 A | 7/2003 |
| JP | 2006-125622 A | 5/2006 |
| JP | 2006-300169 A | 11/2006 |
| JP | 2011-085240 A | 4/2011 |

OTHER PUBLICATIONS

Chinese Office Action, dated May 24, 2019, in Chinese Application No. 201580081893.X and English Translation thereof.
International Search Report (ISR) (PCT Form PCT/ISA/210), in PCT/JP2015/071006, dated Sep. 8, 2015 (English and Japanese versions).
PCT Form PCT/IPEA/409, in PCT/JP2015/071006, dated Aug. 23, 2015.
PCT Form PCT/ISA/237, in PCT/JP2015/071006, dated Sep. 8, 2015.

* cited by examiner

FASTENER

TECHNICAL FIELD

The present invention relates to a fastener which is inserted into a mounting hole to be mounted therein.

BACKGROUND ART

For example, a fastener is used in mounting a member to be mounted or a mounted member such as an insulator or a garnish on a mount member such as a body panel or a body frame of a motor vehicle.

As a conventional fastener of this type, Patent Document 1 below describes a clip which includes a head portion which is provided on one surface side of a base plate, a pillar portion which is provided on the other surface side of the base plate so as to be erected therefrom, a pair of permanent fixing engaging projections provided on the pillar portion for engagement with a permanent fixing mounting hole and a pair of temporary fixing elastic arms which are provided at a distal end of the pillar portion so as to extend therefrom in a cantilever-like fashion for engagement with a temporary fixing mounting hole which is opened wider than the permanent fixing mounting hole on a base plate side thereof. Additionally, the pair of temporary fixing elastic arms are shaped so that proximal end portions project from an outer circumference of the distal end of the pillar portion to extend obliquely outwards as arms of an anchor do towards the head portion. Further, distal end portions of the temporary fixing elastic arms are bent substantially into a collapsed V-like shape so as to move towards each other, and the distal end portions are made into thin portions (refer to FIGS. 1 and 2 of Patent Document 1).

Then, when in a state in which the clip is temporary fixed to an interior material, the head portion is brought into abutment with a front side of the temporary fixing mounting hole, and the distal end portions of the pair of temporary fixing elastic arms are brought into engagement with a circumferential edge of a rear side of the temporary fixing mounting hole, whereby the clip is temporarily fixed to the interior material (refer to FIG. 5). When the pillar portion of the clip is inserted into the permanent fixing mounting hole in the body panel in that state, proximal portion sides of the pair of temporary fixing elastic arms are pressed against an inner circumference of the permanent fixing mounting hole to thereby be contracted radially inwards, and the distal end portions thereof are deformed so as to be bent out of shape, whereby the pillar portion of the clip is disposed in the inner circumference of the permanent fixing mounting hole. Further, since the pair of permanent fixing engaging projecting portions are brought into engagement with a circumferential edge on a rear side of the permanent fixing mounting hole, the interior material is mounted on the body panel via the clip (refer to FIG. 6 of Patent Document 1).

PRIOR ART DOCUMENT

Patent Document

Patent Document 1: JP-A-2006-125622

SUMMARY OF INVENTION

Problems to be Solved by Invention

In the clip of Patent Document 1 above, in such a state that the pair of permanent fixing projecting portions are brought into engagement with the permanent fixing mounting hole in the body panel and that the pair of temporary fixing elastic arms are pressed against an inner circumference of the permanent fixing mounting hole to thereby be deformed, outer circumferences of the proximal end portions of temporary fixing elastic arms (connecting portions with an outer circumference of the pillar portion) protrude more greatly than a bore diameter of the permanent fixing mounting hole in the body panel. Due to this, when the interior material is desired to be removed from the body panel for maintenance or replacement, or the clip itself is desired to be removed from the permanent fixing mounting hole in the body panel, in removing the pillar portion from the permanent fixing mounting hole, the proximal end portions of the temporary fixing elastic arms are caught on the rear side of the permanent fixing mounting hole, leading to a problem with the working efficiency in removal of the clip.

Consequently, an object of the invention is to provide a fastener which is easy to be removed from a mounting hole.

Means for Solving Problems

In order to solve the above problem, according to the invention, there is provided a fastener configured to be mounted by being inserted into a mounting hole, including a head portion which is disposed on a front side of the mounting hole, a leg portion which extends from a rear surface of the head portion to be inserted into the mounting hole, an engaging portion which is provided on the leg portion to be brought into engagement with a rear side of the mounting hole, and an elastic projecting portion which projects outwards of the leg portion from a predetermined position on the leg portion for elastic deformation, wherein with the leg portion inserted in the mounting hole and the engaging portion staying engaged with the rear side of the mounting hole, the elastic projecting portion is brought into abutment with an inner circumference of the mounting hole to thereby be bent, and a largest outside diameter of a portion of the elastic projecting portion which is positioned on the rear side of the mounting hole is set to be equal to or smaller than a bore diameter of the mounting hole.

In the fastener of the invention, it is preferable that the elastic projecting portion projects outwards of the leg portion from a portion which is positioned further inwards of the leg portion than an outer surface of the leg portion.

In the fastener of the invention, it is preferable that a rear side of the head portion and/or the leg portion is provided with a restricting portion configured to be brought into abutment with a circumferential edge of the mounting hole on the front side thereof to thereby restrict the leg portion from being inserted a predetermined amount or more into the mounting hole and that the elastic projecting portion is brought into abutment with the inner circumference of the mounting hole with the restricting portion left in abutment with the circumferential edge of the mounting hole on the front side thereof.

In the fastener of the invention, it is preferable that the head portion has a fixed flange portion having cut-out portions in a plurality of locations in a circumferential direction and a movable flange portions having a shape which substantially matches a shape of the cut-out portions, that the leg portion has a stem portion extending from a rear surface of the fixed flange portion and an elastic locking piece extending from a rear surface of the movable flange and having the engaging portion, and that the elastic projecting portion projects outwards of the stem portion from a predetermined position on the stem portion.

In the fastener of the invention, it is preferable that the fixed flange has the cut-out portions which are formed in the locations which face each other in the circumferential direction and the movable flange is made up of a pair of movable flanges which substantially match the cut-out portions, that the elastic locking piece extends from a rear surface of each of the pair of movable flanges, that the stem portion has a pair of shaft portions which extend from the rear surface of the fixed flange and the pair of shaft portions are shaped so that the shaft portions extend from positions on the fixed flange which are displaced from a center thereof to be connected to each other at distal end sides thereof, that the elastic projecting portion is made up of a pair of elastic projecting portions provided adjacently to the pair of shaft portions, and that when the pair of shaft portions and the pair of elastic projecting portions are seen from a direction along an axis of the leg portion, one of the elastic projecting portions projects outwards of the stem portion from a side surface of one of the shaft portions which is at an opposite side to the direction in which the one of the shaft portions is displaced from the center of the fixed flange and is disposed so as to face the other of the shaft portions with the engaging portion left in engagement with the rear side of the mounting hole, while the other of the elastic projecting portions projects outwards of the stem portion from a side surface of the other of the shaft portions which is at an opposite side to the direction in which the other of the shaft portions is displaced from the center of the fixed flange and is disposed so as to face the one of the shaft portions with the engaging portion left in engagement with the rear side of the mounting hole.

Advantageous Effects of Invention

According to the fastener of the invention, when the fastener is desired to be removed from the mounting hole, the leg portion is removed from the mounting hole using a certain means or by forcibly releasing the engagement between the mounting hole and the engaging portion. As this occurs, since the leg portion can be removed without the elastic projecting portion being caught on the mounting hole, the removal work efficiency of removing the fastener from the mounting hole can be improved. Additionally, when the fastener is mounted in the mounting hole, the elastic projecting portion is bent to be brought into abutment with the inner circumference of the mounting hole, and therefore, a looseness preventing effect is provided by the elastic projecting portion.

BRIEF DESCRIPTION OF DRAWINGS

FIGS. 2A and 2B show the fastener of the invention, in which FIG. 2A is an enlarged perspective of the fastener, and FIG. 2B is an enlarged perspective view of the fastener which results when the fastener is seen from a different direction from the direction in which the faster is seen in FIG. 2A.

EMBODIMENTS OF INVENTION

Figure 1:
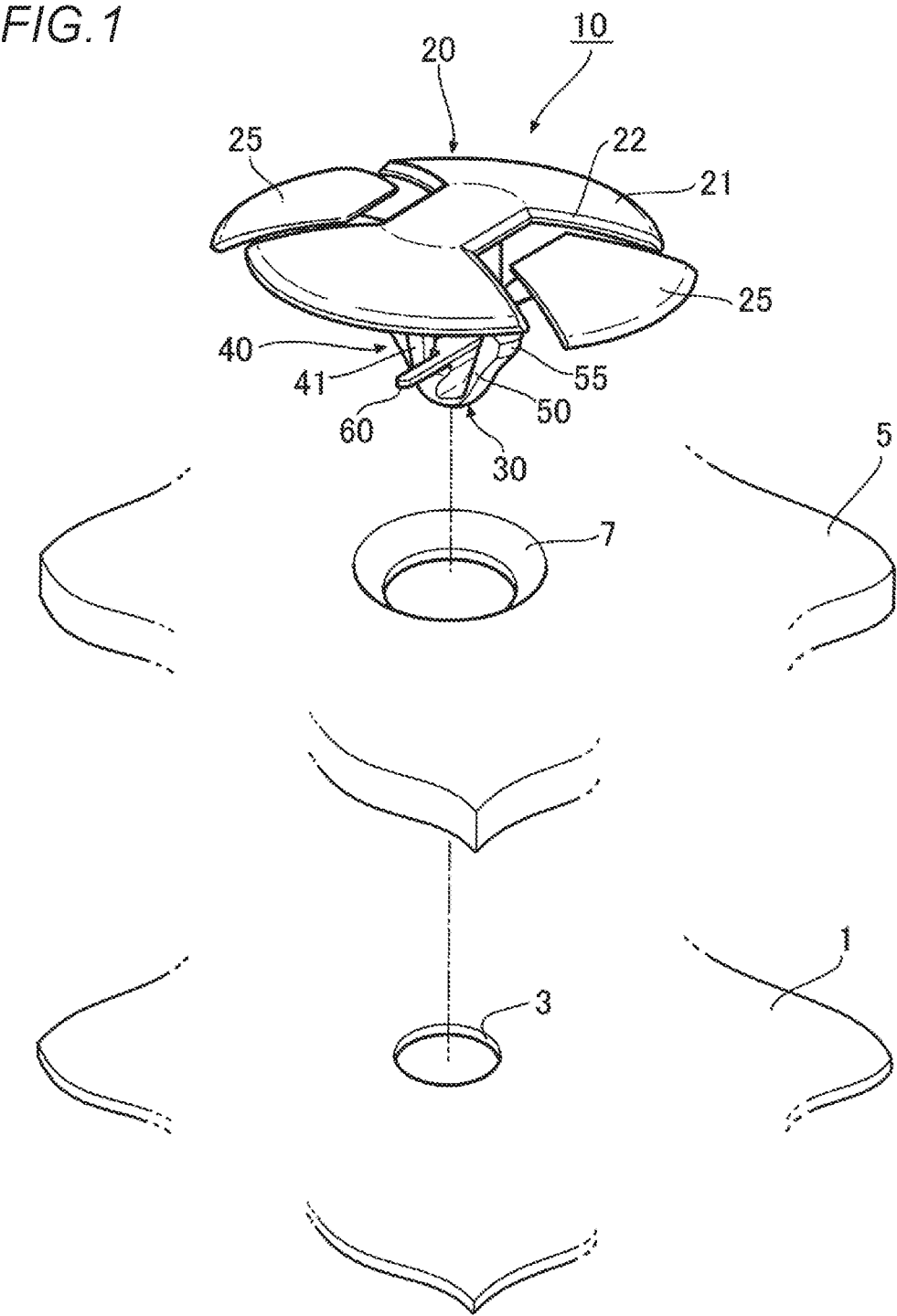
FIG. 1 is a perspective view showing an embodiment of a fastener of the invention.

Hereinafter, referring to the drawings, an embodiment of a fastener of the invention will be described.

Figure 6:
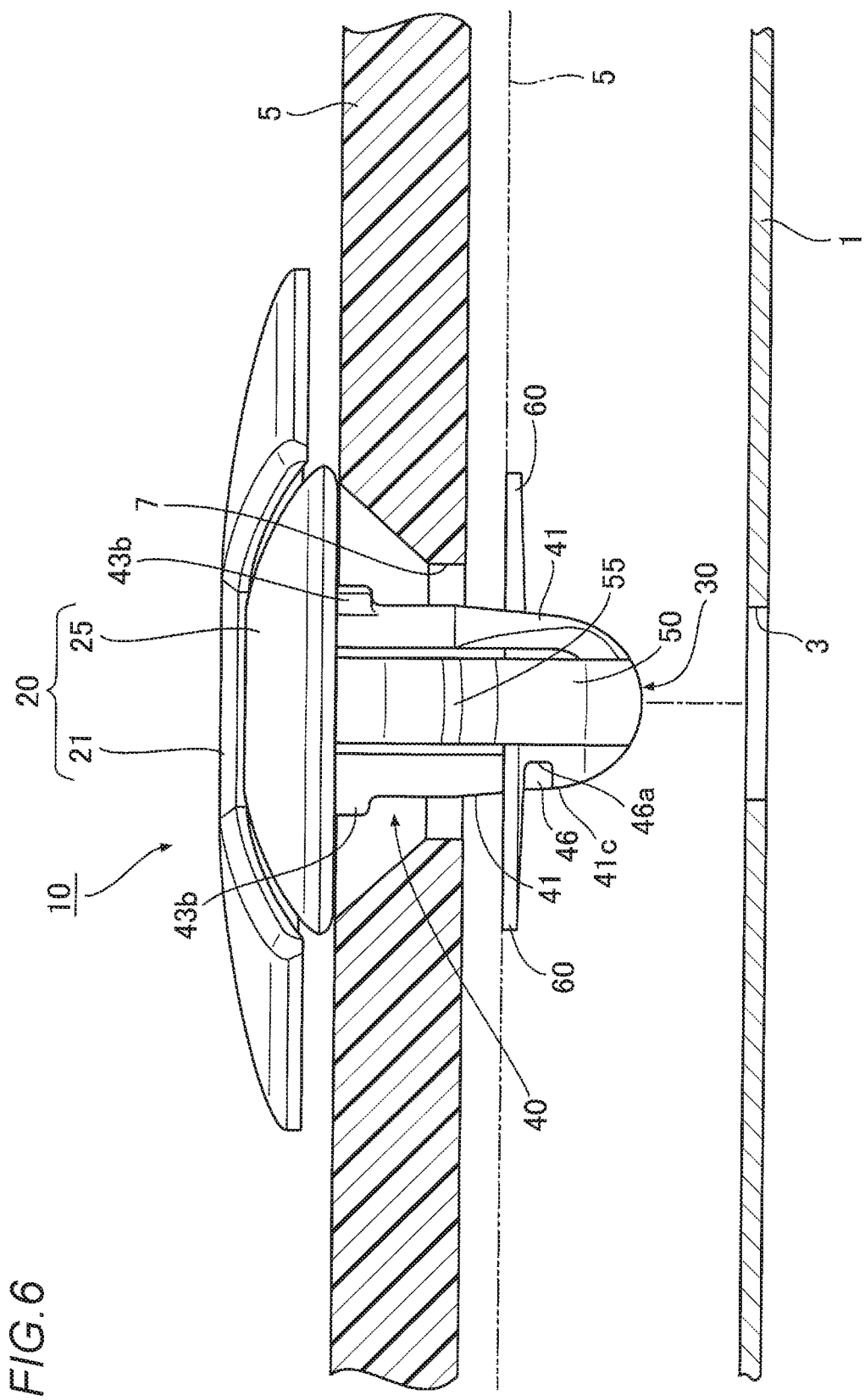
FIG. 6 is an explanatory view showing a state where the fastener is temporarily held on a mounted member.
Figure 8:
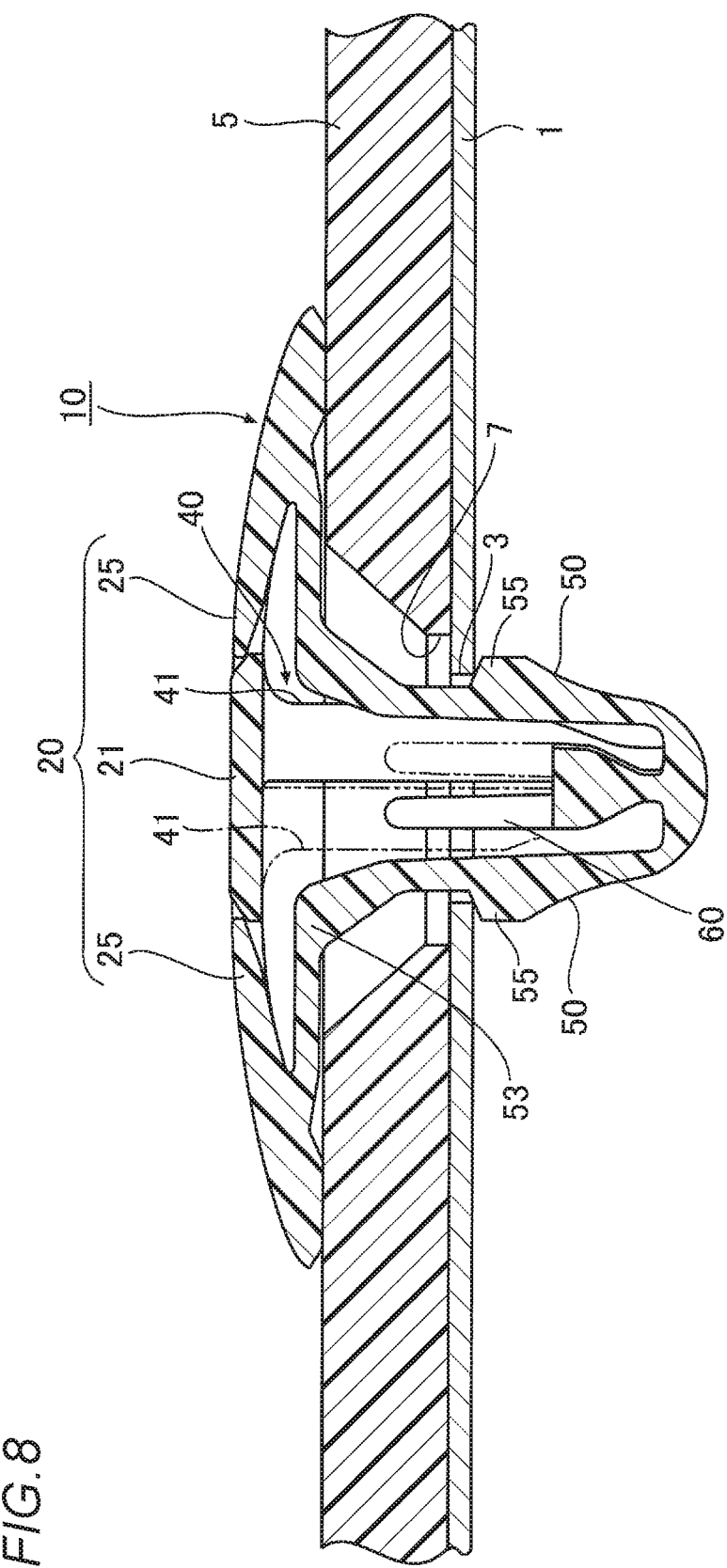
FIG. 8 is an explanatory view showing a state being perpendicular to the state shown in FIG. 7.

This fastener is inserted into a mounting hole formed in a predetermined member and is fixed in place in the mounting hole. As shown in FIGS. 1, 6 and 8, a fastener 1 according to this embodiment is configured, for example, to be inserted into a circular holding hole 7 formed in a member to be mounted or a mounted member 5 to be held temporarily therein and then to be inserted into a circular mounting hole 3 formed in a mount member 1 to be fixed in place therein and is used to mount the mounted member 5 on the mount member 1.

When referred to in describing the invention, a "rear side of the mounting hole" means one side portion of the member (here, the mount member 1) where the mounting hole is formed in relation to a thickness direction which is at an opposite side to a side where a head portion of the fastener is disposed. Additionally, the "inner surface of the mounting hole" means a radial inner circumferential surface of the mounting hole.

As the mount member 1, for example, a body panel or a body frame is raised, and as the mounted member 5, for example, an insulator (a soundproofing material), a garnish, a trim board or a cover is raised. However, the mount member 1 and the mounted member 5 are not limited to those described above. The fastener may be used not only for the use described above but also to close the mounting hole (as a so-called hole plug). Hence, there is imposed no specific limitation to the use of the fastener.

As shown in FIGS. 2A to 5, this fastener 10 has a head portion 20 which is disposed on a front side of the mounting hole 3 in the mount member 1 and a leg portion 30 which extends from a rear surface side (an opposite surface side to the mount member 1) of the head portion 20. The leg portion 30 has, in turn, engaging portions 55 which are brought into engagement with a rear side of the mounting hole 3 and elastic projecting portions 60 which are project outwards of the leg portion from predetermined positions of the leg portion 30 and which can be deformed elastically.

Firstly, the head portion 20 will be described. The head portion 20 of this embodiment has a fixed flange 21 having cut-out portions 22 at a plurality of locations in a circumferential direction and movable flanges 25 which have a shape which matches substantially a shape of the cut-out portions 22.

Figure 2A:
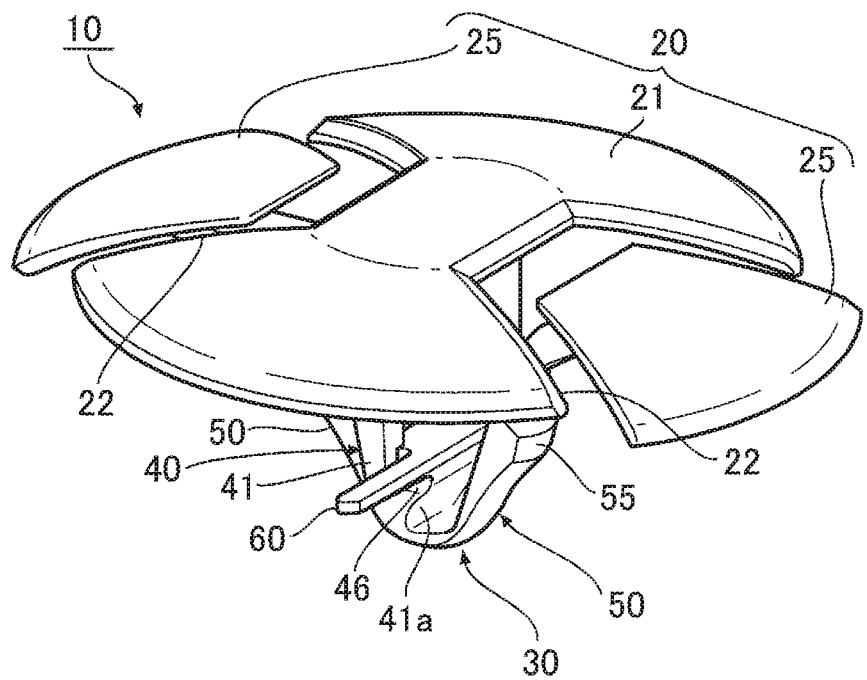
Figure 2B:
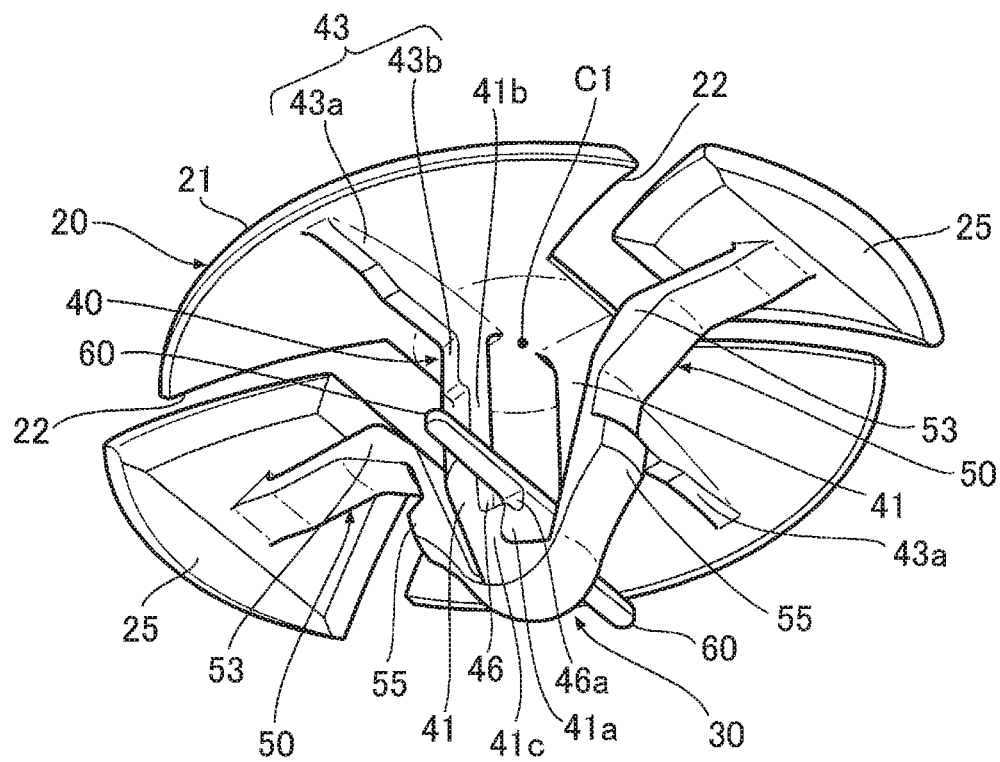
Figure 5:
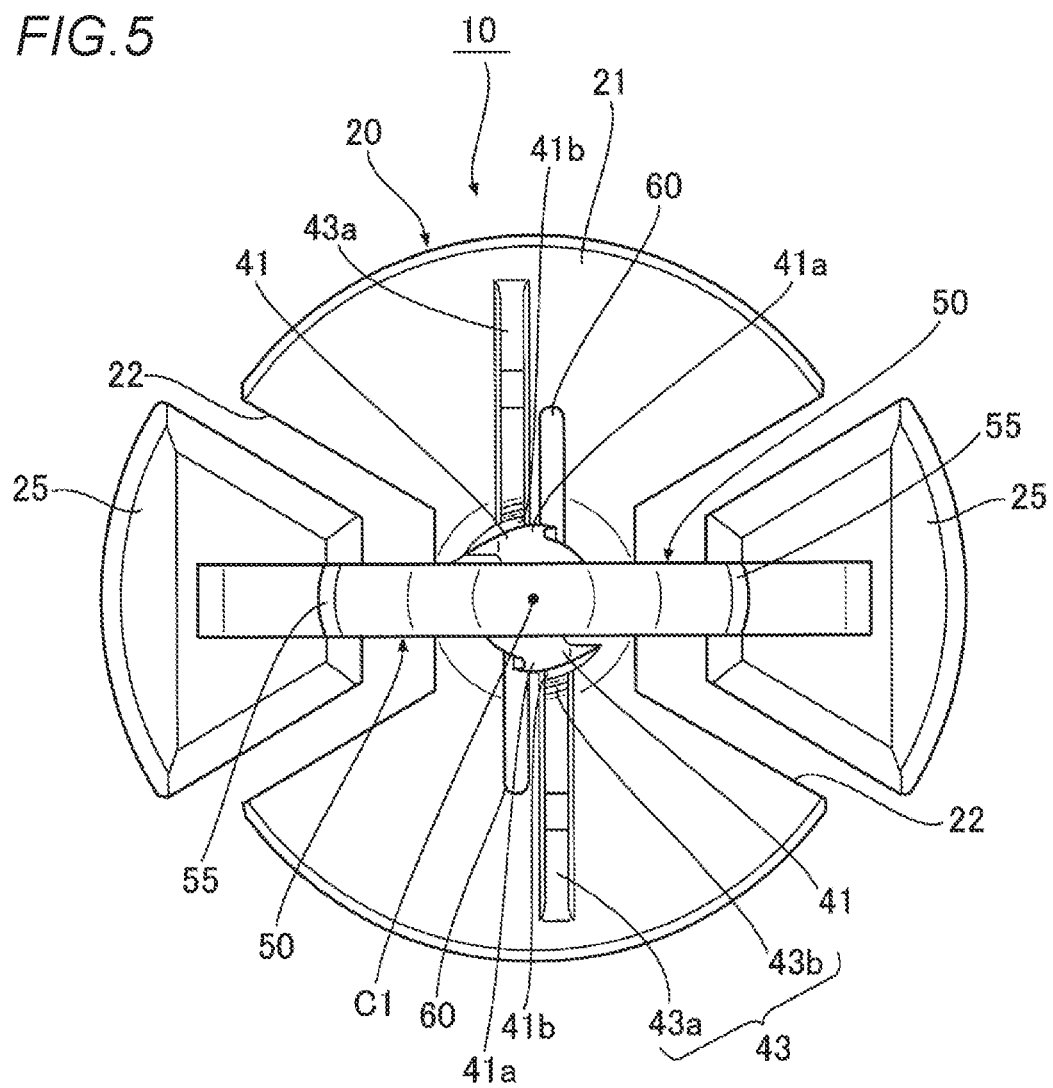
FIG. 5 is a bottom view of the fastener.

As shown in FIGS. 2A and 5, the fixed flange 21 expands obliquely outwards from a center C1 thereof (refer to FIGS. 2B and 5) with a moderate curve into the shape of a skirt to have an arc-shaped outer circumferential edge and has the pair of cut-out portions 22, 22 at the opposite facing locations in the circumferential direction. The pair of cut-out portions 22, 22 are cut out so that radially inner sides thereof are parallel to each other and have a substantially trapezoidal shape which expands gradually towards radially outer sides (refer to FIG. 5). On the other hand, as shown in FIGS. 2A, 2B and 5, the movable flanges 25 are a pair of substantially trapezoidal flanges which match substantially the pair of cut-out portions 22, 22 of the fixed flange 21.

The head portion is not limited to the flange having the cut-out portions in shape, and hence, a flange having a circular umbrella shape (this will be described in an embodiment which will be described later) or a flange having a rectangular shape or a long plate-like shape may be provided as the head portion. Alternatively, a construction may be adopted in which a plurality of flanges are provided and are inserted into a frame-shaped member provided on a mounted member. Thus, there is imposed no specific limitation on the shape of the head portion.

Next, the leg portion 30 will be described. The leg portion 30 of this embodiment has a stem portion 40 which extends from a rear surface of the fixed flange 21 and a pair of elastic locking pieces 50, 50 which extend individually from rear surfaces of the pair of movable flanges 25, 25 and on which the engaging portions 55 are provided.

In addition, as shown in FIG. 2B and FIGS. 3 to 5, the stem portion 40 has a pair of shaft portions 41, 41 which extend from the rear surface of the fixed flange 21. As shown in FIG. 5, the pair of shaft portions 41, 41 are shaped so that they extend from positions on the fixed flange 21 which are both displaced from the center C1 thereof to be connected to each other at distal end sides thereof.

Figure 3:
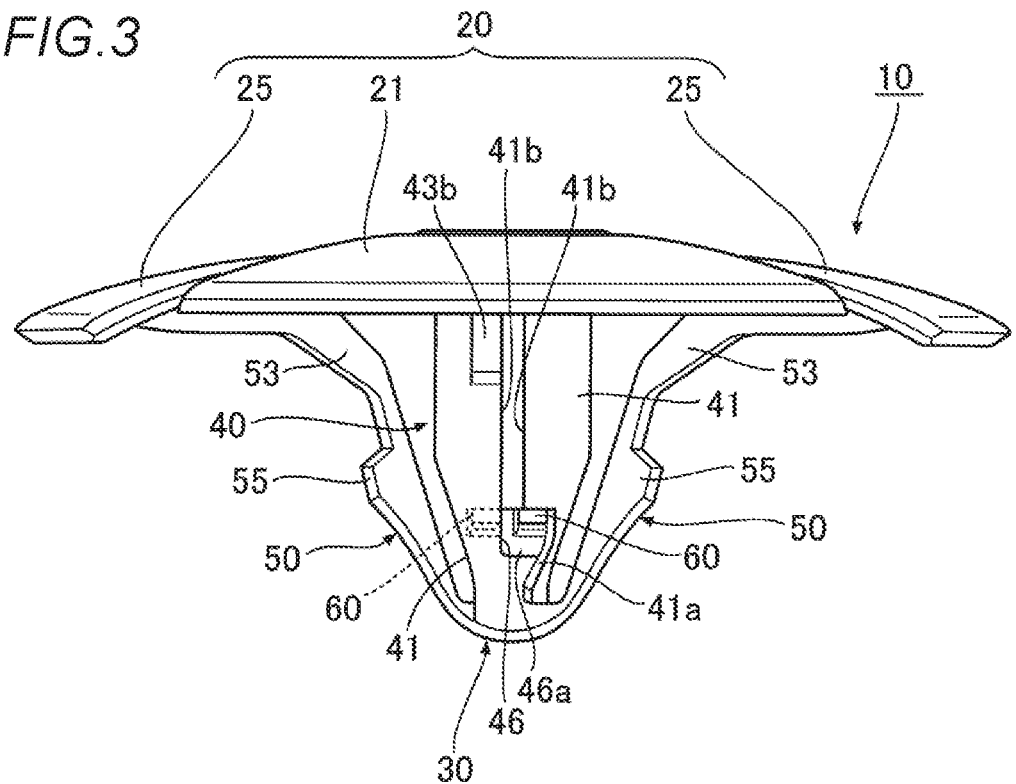
FIG. 3 is a front view of the fastener.

On the other hand, as shown in FIG. 2B, the pair of elastic locking pieces 50, 50 are shaped so that they extend individually from rear surfaces of the pair of movable flanges 25, 25 to be connected to both sides of the distal end side connecting portion where the pair of shaft portions 41, 41 are connected together. To describe this in detail, as shown in FIGS. 2B and 3, the pair of elastic locking pieces 50, 50 are made up of portions which extend obliquely outwards towards the fixed flange 21 from the both sides of the distal end side connecting portion where the pair of shaft portions 41, 41 are connected together and extend via bent portions 53 at angles which are substantially parallel to the movable flanges 25. Additionally, the engaging portion 55 configured to be brought into engagement with the rear side of the mounting hole 3 in the mount member 1 is provided at a predetermined location on an outer surface of a portion of each elastic locking piece 50 which extends obliquely outwards.

Further, as shown in FIG. 5, when seen from the direction along the axis of the leg portion 30, the pair of elastic locking pieces 50, 50 are disposed substantially perpendicular to the pair of shaft portion 41, 41. Additionally, the pair of elastic locking pieces 50, 50 expand as shown in FIGS. 2A, 2B and 3 in a free state where the pair of elastic locking pieces 50, 50 are not inserted into the mounting hole 3 and are contracted radially inwards as a result of the elastic locking pieces 50, 50 being pressed against an inner circumference of the mounting hole in a state where the pair of elastic locking pieces 50, 50 are inserted into the mounting hole 3 (refer to FIG. 8).

There is imposed no specific limitation on the shape of the elastic locking pieces 50, provided that they are constructed so as to connect the movable flanges 25 to the leg portion 30.

Returning to the description of the leg portion 30, as shown in FIGS. 2A, 2B, 3 and 5, a distal end portion 41a of each shaft portion 41 which makes up the leg portion 30 in relation to an extending direction thereof is shaped so as to project towards an opposite side to a direction in which the shaft portion 41 is displaced from the center C1 of the fixed flange 21, and the distal end portions 41a, 41a are connected to each other via a connecting portion 44 (refer to FIG. 7) which is disposed at the center of the fixed flange, whereby the pair of shaft portions 41, 41 are integrated together. In addition, as shown in FIGS. 2B and 4, a recess portion 46 is provided at a portion of the distal end portion 41a which is at a side of the fixed flange 21, and this recess portion 46 is formed so deep into an interior of the leg portion (a direction towards the center C1 of the fixed flange 21) as to extend inwards beyond an outer surface 41c of the shaft portion 41.

The elastic projecting portions 60 of this embodiment which project outwards of the leg portion 30 from the predetermined positions thereon have the following construction.

Figure 4:
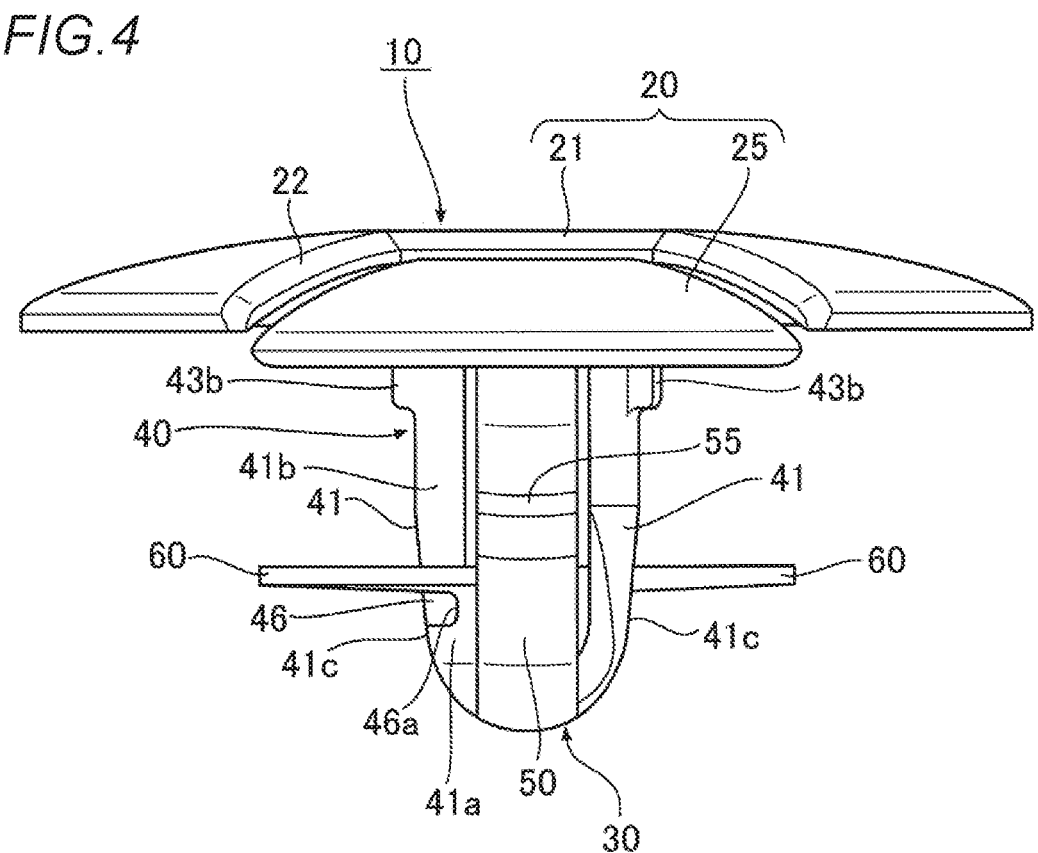
FIG. 4 is a side view of the fastener.

As shown in FIGS. 2A, 2B and 4, the elastic projecting portions 60 of this embodiment each project outwards of the stem portion from a position adjacent to the shaft portion 41 which lies on a bottom surface 46a of the recess portion 46 provided on the shaft portion 41 so as to be formed into the shape of a thin, long and rectilinearly extending whisker. Namely, the elastic projecting portions 60 are shaped so that they each project outwards of the leg portion and so long as to extend beyond the outer surface 41c of the leg portion 30 from the portion (here, the bottom surface 46a of the recess portion 46) positioned deeper inwards of the leg portion than the outer surface 41c of the leg portion 30 (refer to FIG. 4). Additionally, as shown in FIG. 3, the recess portions 46 are provided on circumferences of proximal end portions of the elastic projecting portions 60, and the elastic projecting portions 60 are provided away from the shaft portions 41 in a direction perpendicular to an axial direction of the shaft portions 41 so as to be separated to be independent of the shaft portions 41 in a cantilever fashion, whereby the elastic projecting portions 60 can be deformed elastically and flexibly. Due to this, it is difficult for the shaft portions 41 to be affected by the bending of the elastic projecting portions 60, and the head portion 20 can be disposed on a front side of the holding hole 7 in the mounted member 5 without any gap provided therebetween and therefore a looseness can be prevented. In this embodiment, although the head portion 20 is disposed on the front side of the holding hole 7 in the mounted member 5, or in other words, the head portion 20 is disposed on a front side of the mounting hole 3 in the mount member 1 indirectly via the mounted member 5. The head portion of the invention also includes a form like this. In the case where the mounted member 5 is not mounted on the mount member 1, the head portion 20 is disposed directly on the front side of the mounting hole 3 in the mount member 1.

Further, as shown in FIGS. 2B, 4 and 5, in this embodiment, the pair of elastic projecting portions 60, 60 are provided adjacent to the pair of shaft portions 41, 41. Specifically speaking, as shown in FIG. 5, when the pair of elastic projecting portions 60, 60 and the pair of shaft portions 41, 41 are seen from a direction along the axis of the leg portion 30, one of the elastic projecting portions 60 project outwards of the stem portion from a side face 41b (refer to FIGS. 2B and 3) of one of the shaft portions 41 which is at an opposite side to a direction in which the one shaft portion 41 is displaced from the center C1 of the fixed flange 21 and is disposed so as to face the other shaft portion 41 with the engaging portion 55 left in engagement with the rear surface of the mounting hole 3, while the other elastic projecting portion 60 projects outwards of the stem portion from a side face 41b of the other shaft portion 41 which is at an opposite side to a direction in which the other shaft portion is displaced from the center C1 of the fixed flange portion 21 and is disposed so as to face the one shaft portion 41 with the engaging portion 55 left in engagement with the rear surface of the mounting hole 3.

Figure 7:
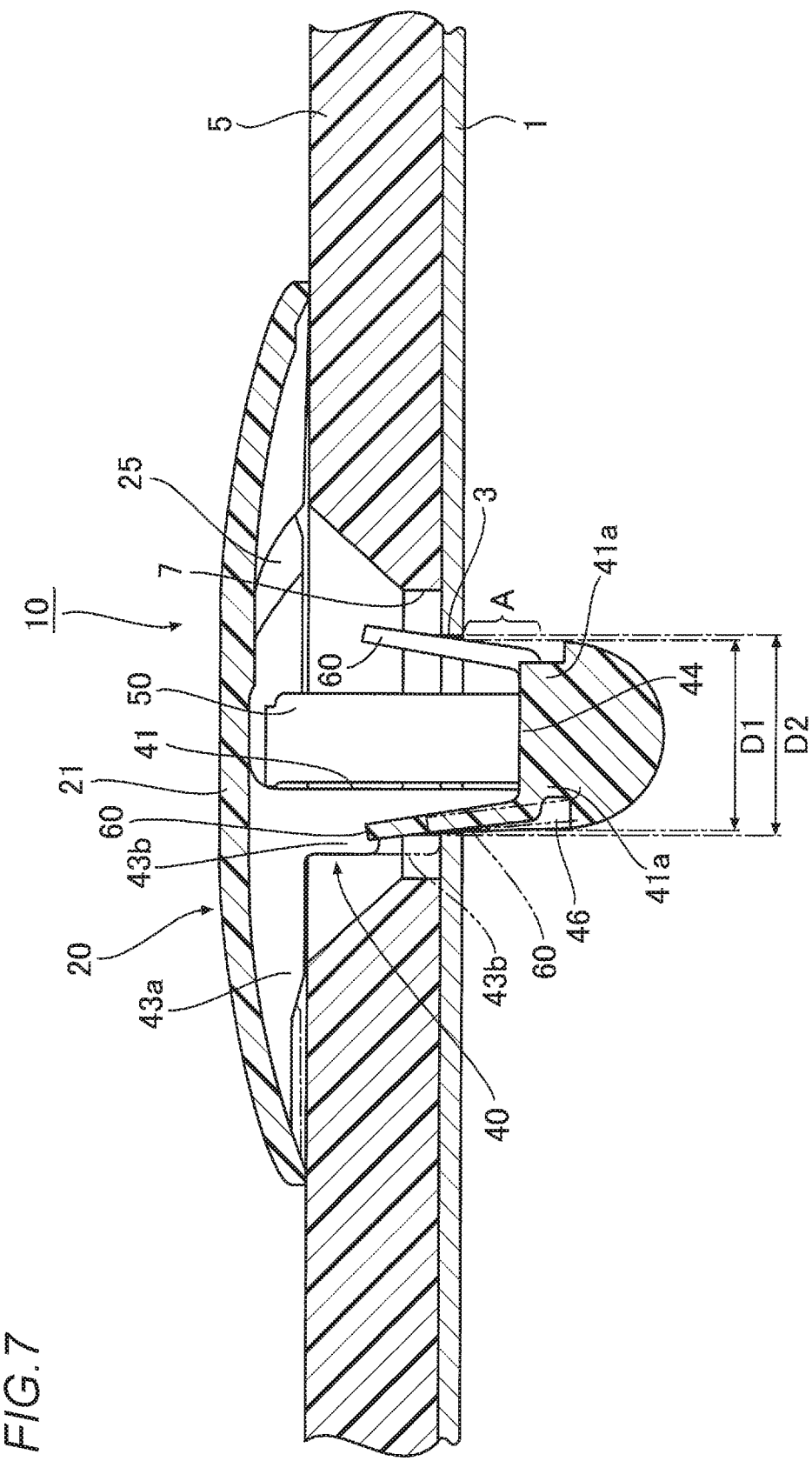
FIG. 7 is an explanatory view shown a state where the fastener is mounted in a mounting hole.
Figure 9:
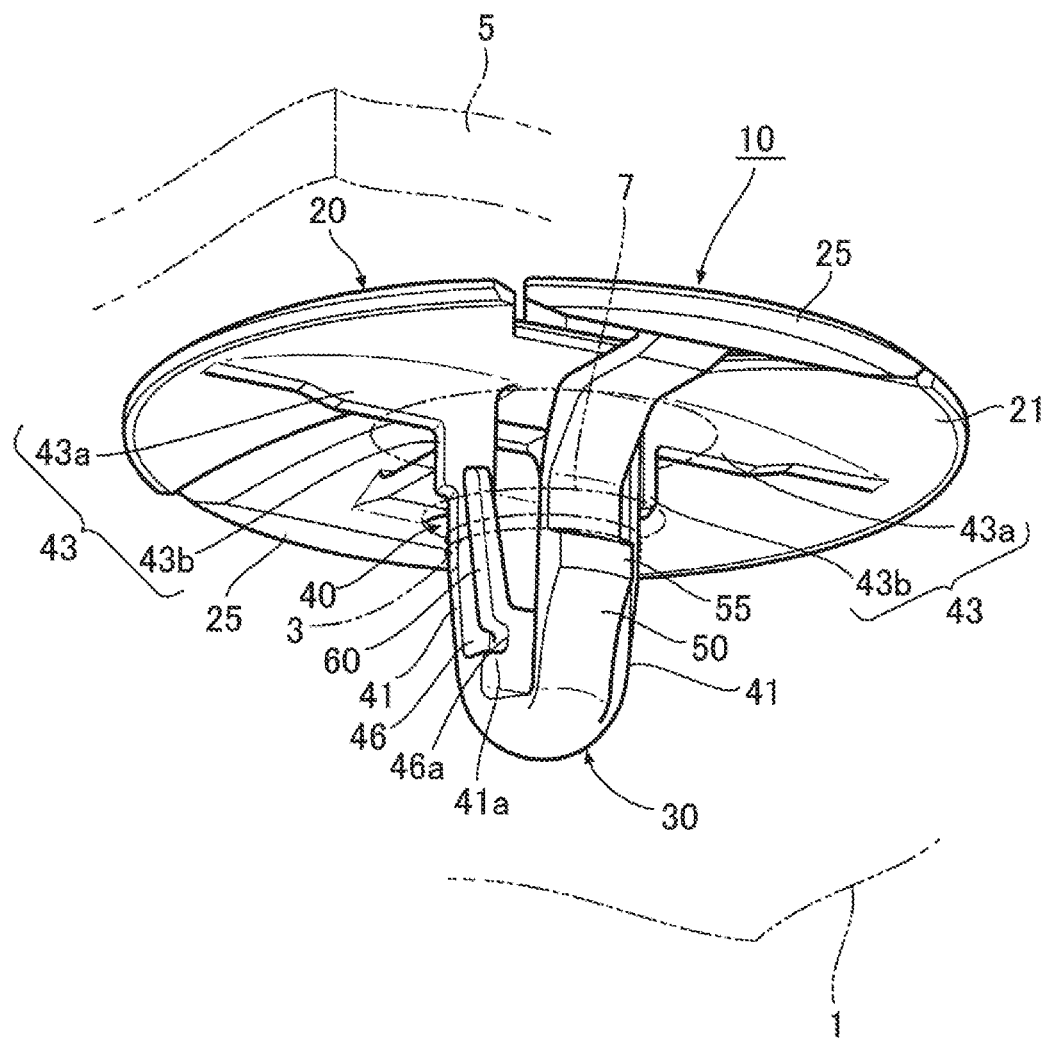
FIG. 9 is a perspective view showing a state where the fastener is mounted in the mounting hole.

Then, with the leg portion 30 inserted into the mounting hole 3 in the mount member 1 and the engaging portions 55 of the elastic locking pieces 50 left in engagement with the rear side of the mounting hole 3 (refer to FIG. 8), the elastic projecting portions 60 are, as shown in FIGS. 7 and 9, brought into abutment with the inner circumference of the mounting hole 3 to be bent, and a largest outside diameter defined by portions of the elastic projecting portions 60 which are positioned on the rear side of the mounting hole 3 is set to be equal to or smaller than a bore diameter of the mounting hole 3, whereby the elastic projecting portions 60 are made so as not to be brought into engagement with the rear side of the mounting hole 3.

Here, as shown in FIG. 7, a largest outside diameter D1 (here, the largest outside diameter defined by the pair of elastic projecting portions 60, 60) defined by portions A of the elastic projecting portions 60 in the state described above which are positioned on the rear side of the mounting hole 3 is designed to be equal to or smaller than a bore diameter D2 of the mounting hole 3. In the case where one elastic projecting portion 60 is provided, an outside diameter defined by the one elastic projecting portion 60 and a portion facing the elastic projecting portion 60 constitutes the "largest outside diameter" of the invention.

In addition, the elastic projecting portions 60 of this embodiment which are formed into the shape of the thin, long and rectilinearly extending whisker project, as shown in FIG. 4, at substantially right angles to a direction in which the shaft portions 41 extend from a rear surface of the fixed flange 21 at substantially right angles thereto in a free state where the elastic projecting portions 60 are not inserted into the mounting hole 3. However, the elastic projecting portions 60 may be inclined relative to the extending direction of the shaft portions 41, and hence, there is imposed no specific limitation on the way in which the elastic projecting portions 60 extend.

In the case of this embodiment, although the elastic projecting portions 60 take the form of a thin and long whisker, the elastic projecting portions 60 may take the form of a thin and long strip or a flap, and there is imposed no specific limitation on the shape of the elastic projecting portions 60, provided that the elastic projecting portions 60 are constructed so as to be elastically deformed to be bent when they are brought into abutment with the inner circumference of the mounting hole and so that a largest outside diameter defined by the portions thereof which are positioned on the rear side of the mounting hole is set to be equal to or smaller than the bore diameter of the mounting hole 3. In addition, in this embodiment, although the recess portions 46 are provided on the shaft portions 41 and the rectilinear elastic projecting portions 60 are provided to extend from the bottom surfaces 46a of the recess portions 46, for example, notches or slits may be provided in the shaft portions 41 so that the elastic projecting portions project from interiors of the notches or slits. Further, proximal end portion sides of the elastic projecting portions may be bent into an L-like shape to be connected to side surfaces of the shaft portions 41 so that the elastic projecting portions project towards outwards of the leg portions. Furthermore, in this embodiment, although the pair of elastic projecting portions 60, 60 are provided in the positions lying adjacent to the pair of shaft portions 41, 41 so as to correspond to the shaft portions 41, 41, the number of elastic projecting portions 60 to be provided may be one or three or more.

In addition, as shown in FIG. 2B, the rear side of the head portion 20 and the leg portion 30 are provided with restricting portions 43 configured to be brought into abutment with a circumferential edge on a front side of the mounting hole 3 in the mount member 1 to restrict the leg portion 30 from being inserted a predetermined amount or more deep into the mounting hole 3, and the elastic projecting portions 60 are configured to be brought into abutment with the inner circumference of the mounting hole 3 in such a state that the restricting portions 43 are brought into abutment with the circumferential edge of the mounting hole 3 on the front side thereof (refer to FIG. 7).

As shown in FIG. 2B, the restricting portions 43 of this embodiment are each made up of a first restricting portion 43a which extends radially outwards towards an outside diameter side of the fixed flange 21 into a rib-like shape from respective proximal end portions of the shaft portions 41 (connecting portions where the shaft portions 41 connect to the fixed flange 21) of the stem portion 40 which makes up the leg portion 30, and which is provided on a rear surface side of the fixed flange 21; and a second restricting portion 43b having a rib-like shape which is provided on an outer surface side of the proximal end portion of each shaft portion 41 so as to extend along an axial direction of the shaft portion 41. The second restricting portion 43b is configured to pass through the holding hole 7 in the mounted member 5 but not to pass through the mounting hole 3 in the mount member 1.

Then, as shown in FIG. 7, when the leg portion 30 is pushed into the mounting hole 3 in an attempt to insert the leg portion 30 into the mounting hole 3 in order for the engaging portions 55 to be brought into engagement with the rear side of the mounting hole 3, although the fixed flange 21 is deformed so that the leg portion 30 is pushed deeper than required into the mounting hole 3, as indicated by imaginary lines in FIG. 7, the second restricting portions 43b of the restricting portions 43 are brought into abutment with the circumferential edge on the front side of the mounting hole 3, and in this state, the elastic projecting portions 60 are brought into abutment with the inner circumference of the mounting hole 3, so that distal ends of the elastic projecting portions 60 are prevented from extending through the mounting hole 3 to the rear side thereof. Additionally, as this occurs, since the first restricting portions 43a are brought into abutment with a circumferential edge on a front side of the holding hole 7 in the mounted member 1, the first restricting portions 43a contribute to restricting the leg portion 30 from being inserted the predetermined amount or more deep into the mounting hole 3.

The first restricting portions 43a do not necessarily have to be provided as part of the restricting portions, provided that the fastener 10 has a portion which is brought into abutment with the mounting hole 3, and hence, there is imposed no specific limitation on the configuration of the restricting portions. In this embodiment, although the restricting portions are provided on the rear side of the head portion 20 and the leg portion 30, they may be provided only on the rear side of the head portion 20 or only on the leg portion 30.

Next, a method for using the fastener 10 configured in the way described heretofore and working effects thereof will be described.

Firstly, the leg portion 30 of the fastener 10 is inserted continuously into the holding hole 7 in the mounted member 5 from the front side thereof. Then, the pair of elastic locking pieces 50, 50 are pressed against an inner circumference of the holding hole 7 to be deflected inwards of the leg portion, and the distal end portions of the pair of elastic projecting portions 60, 60 are pressed against the inner circumference of the holding hole 7 to be elastically deformed. Thereafter, when the pair of elastic projecting portions 60, 60 pass through the holding hole 7 to the rear side thereof, the elastic projecting portions 60, 60 are elastically restored to be disposed on the rear side of the holding hole 7 while being spaced away from the holding hole 7. Further, when the engaging portions 55 of the elastic locking pieces 50 pass through the holding hole 7 to the rear side thereof, the pair of elastic locking pieces 50, 50 are elastically restored, and the engaging portions 55, 55 thereof are brought into engagement with the rear side of the holding hole 7, the movable flanges 25, 25 of the head portion 20 being brought into abutment with the front side of the holding hole 7, whereby the fastener 10 is temporarily held in the holding hole 7 as shown in FIG. 6.

In addition, even though the pair of movable flanges 25, 25 are deflected radially inwards, causing the engaging portions 55 to be dislocated from the rear side of the mounting hole 3 while transporting or working on the mounted member 5, since the pair of elastic projecting portions 60, 60 are brought into engagement with the rear side of the holding hole 7 as shown by an imaginary line in FIG. 6, the temporary holding state of the fastener 10 can be maintained.

Namely, in this fastener 10, the leg portion 30 is inserted into a hole (the holding hole 7) in the mounted member 5 such as an insulator, so that the pair of elastic locking pieces 50, 50 are brought into engagement with the rear side of the holding hole 7 and the pair of elastic projecting portions 60, 60 are disposed on the rear side of the holding hole 7, whereby the fastener 10 can be temporarily held on to the mounted member so as to be prevented from being dislocated from the mounted member.

As described above, the leg portion 30 is inserted continuously into the mounting hole 3 in the mount member 1 as shown in FIG. 6 with the fastener 10 held temporarily in the holding hole 7. Then, the pair of elastic locking pieces 50, 50 are pressed against the inner circumference of the mounting hole 3 to be deflected radially inwards of the leg portion, and the distal end portions of the pair of elastic projecting portions 60, 60 are pressed against the inner circumference of the mounting hole 3 to be elastically deformed to be bent radially inwards of the leg portion (refer to FIGS. 7 and 9). Thereafter, when the engaging portions 55 of the elastic locking pieces 50 pass through the holding hole 7 to the rear side thereof, the pair of elastic locking pieces 50, 50 are elastically restored, and not only are the engaging portions 55, 55 thereof brought into engagement with the rear side of the mounting hole 3, but also the pair of movable flanges 25, 25 enter the cut-out portions 22, 22 of the fixed flange 21, whereby the fixed flange 21 and the movable flanges 24, 24 of the head portion 20 are brought into abutment with the front side of the holding hole 7 in the mounted member 5 (refer to FIG. 8). As a result of this, since the mount member 1 and the mounted member 5 are held between the head portion 20 and the engaging portions 55 of the leg portion 30 of the fastener 10, the mounted member 5 can be mounted on the mount member 1 via the fastener 10 (refer to FIGS. 7 and 8).

As this occurs, as shown in FIGS. 7 and 9, the pair of elastic projecting portions 60, 60 are brought into abutment with the inner circumference of the mounting hole 3 to be bent, and the distal end portions thereof are held so as not to be dislocated from the rear side of the mounting hole 3. In this way, since the pair of elastic projecting portions 60, 60 are bent to be brought into abutment with the inner circumference of the mounting hole 3 with the fastener 10 mounted in the mounting hole 3, the fastener 10 can be mounted in the mounting hole 3 while the looseness thereof is suppressed.

Further, in this embodiment, as has been described above, the rear side of the head portion 20 and the leg portion 30 are provided with the restricting portions 43 configured to be brought into abutment with the circumferential edge on the front side of the mounting hole 3 in the mount member 1 to restrict the leg portion 30 being inserted the predetermined amount or more deep into the mounting hole 3, so that the elastic projecting portions 60 are brought into abutment with the inner circumference of the mounting hole 3 with the restricting portions 43 left in abutment with the circumferential edge on the front side of the mounting hole 3. Due to this, when the leg portion 30 of the fastener 10 is inserted into the mounting hole 3 so that the engaging portions 55 are brought into engagement with the rear side of the mounting hole 3, even though the leg portion 30 is forcibly pushed into the mounting hole 3, the elastic projecting portions 60 are brought into abutment with the inner circumference of the mounting hole 3 (refer to imaginary lines in FIG. 7) with the restricting portions 43 provided on the rear side of the head portion 20 and the leg portion 30 (here, the second restricting portions 43b) left in abutment with the circumferential edge on the front side of the mounting hole 3, whereby the inserting position of the leg portion 30 is restricted. Thus, the distal end portions of the elastic projecting portions 60 can be prevented from passing through the mounting hole 3 to the rear side thereof (refer to imaginary lines in FIG. 7). As a result of this, since the state is maintained where the elastic projecting portions 60 are bent to be in abutment with the inner circumference edge of the mounting hole 3, as will be described later, when the leg portion 30 is pulled out of the mounting hole 3, the elastic projecting portions 60 can be prevented from being caught on the rear side of the mounting hole 3 in an ensured fashion, thereby making it possible to improve the efficiency of the removing work of the fastener 10 more.

Then, when the mounted member 5 is desired to be removed from the mount member 1 for the reason that the vehicle is serviced for maintenance or that the mounted member 5 is replaced by another mounted member or when the fastener 10 itself is desired to be removed from the mounting hole 3, the following operations will be carried out.

Figure 10:
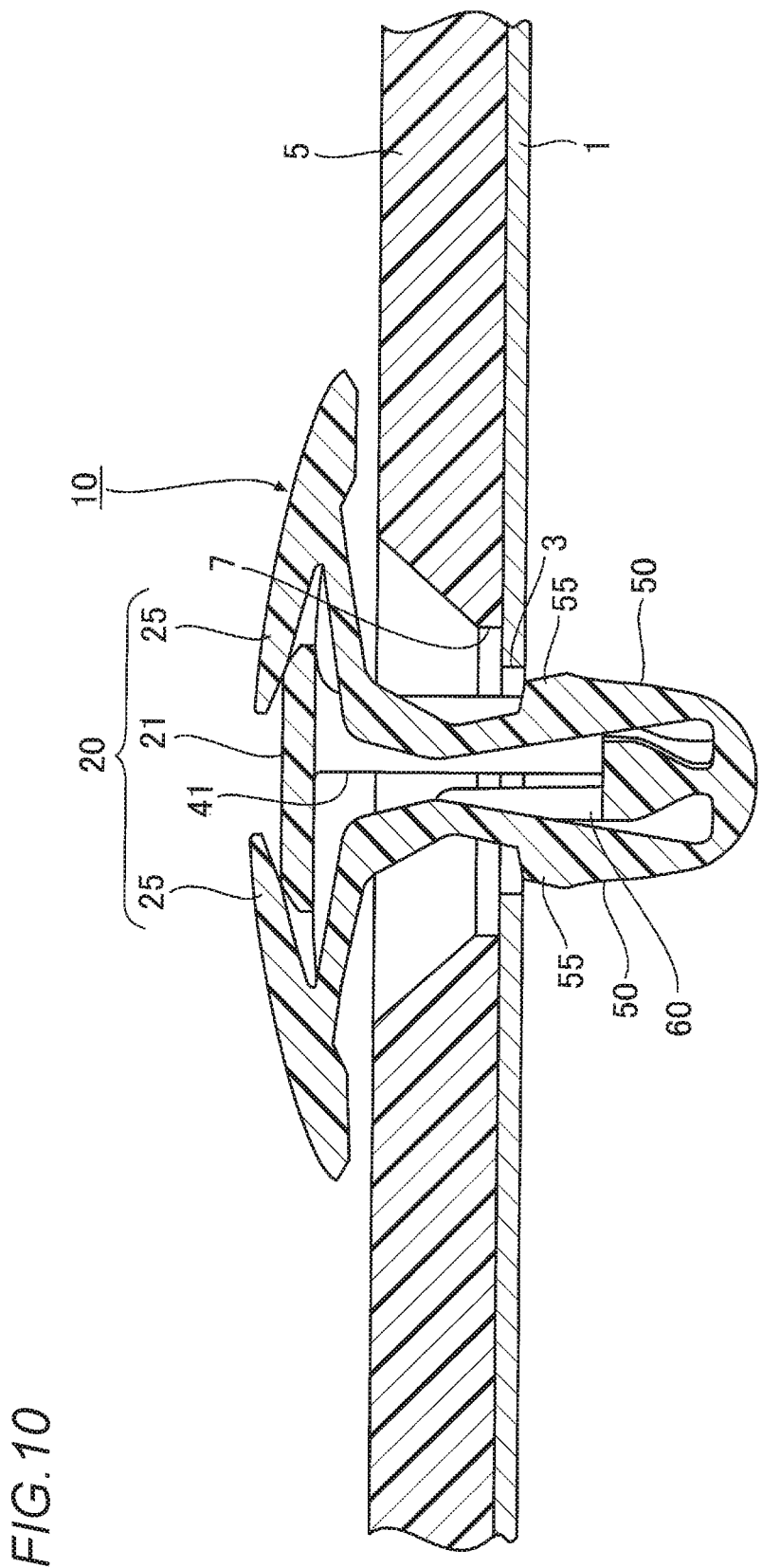
FIG. 10 is an explanatory view showing a state where the fastener is removed from the mounting hole.

Namely, as shown in FIG. 10, the pair of movable flanges 25, 25 are moved to be collected together radially inwards of the fixed flange 21 so that the movable flanges 25, 25 move towards each other. Then, the movable flanges 25, 25 move onto the surface side of the fixed flange 21, and simultaneously, the pair of elastic locking pieces 50, 50 which extend from the movable flanges 25 are deflected continuously inwards of the leg portion, whereby the engaging portions 55, 55 are dislocated from the rear side of the mounting hole 3 (refer to FIG. 10). The leg portion 30 is removed continuously from the mounting hole 3 with the state described above maintained.

As this occurs, with the engaging portions 55 of the elastic locking pieces 50 left in engagement with the rear side of the mounting hole 3, the elastic projecting portions 60 of the fastener 10 are brought into abutment with the inner circumference of the mounting hole 3 to be bent, and the largest outside diameter D1 defined by the portions A of the elastic projecting portions 60 which are positioned on the rear side of the mounting hole 3 is set to be equal to or smaller than the bore diameter D2 of the mounting hole 3 (refer to FIG. 7). Thus, the leg portion 30 can be removed from the mounting hole 3 without the elastic projecting portions 60 being caught on the rear side of the mounting hole 3, thereby making it possible to improve the efficiency of the removing work of the fastener 10 from the mounting hole 3.

In addition, in this embodiment, the elastic projecting portions 60 are constructed so as to project radially outwards of the leg portion from the portions lying further inwards than the outer surfaces 41c of the leg portion 30 (here, the bottom surfaces 46a of the recess portions 46) (refer to FIGS. 2B and 4). Due to this, with the engaging portions 55 left in engagement with the rear side of the mounting hole 3, it can be made difficult for outer circumferences of the proximal end portion sides of the elastic projecting portions 60 which are portions which project from an outer surface of the leg portion to protrude beyond the bore diameter of the mounting hole 3, so that the elastic projecting portions 60 are prevented from being caught on the rear side of the mounting hole 3 effectively when the leg portion 30 is removed from the mounting hole 3, thereby making it possible to improve more the efficiency of the removing work of the fastener 10. In addition, since the projecting length of the elastic projecting portions 60 can be lengthened, the elastic projecting portions 60 can be bent easily, whereby the insertion of the elastic projecting portions 60 into the mounting hole 3 can be facilitated.

Further, in this embodiment, the head portion 20 has the fixed flange 21 having the cut-out portions 22 and the movable flanges 25 having the shape which matches substantially the shape of the cut-out portions 22, and the leg portion 30 has the stem portion 40 which extends from the rear surface of the fixed flange 21 and the elastic locking pieces 50 which extend from the rear surfaces of the movable flanges 25. Thus, with the engaging portions 55 left in engagement with the rear side of the mounting hole 3, leaving the fastener 10 mounted in the mounting hole 3, when the fastener 10 is desired to be removed from the mounting hole 3, the engaging portions 55 can be dislocated from the rear side of the mounting hole 3 by elastically deforming the elastic locking pieces 50 through the simple work of collecting the movable flanges 25 together radially inwards of the fixed flange 21. Then, since the leg portion 30 should be pulled out of the mounting hole 3 with the state described above maintained, the efficiency of the removing work of the fastener 10 from the mounting hole 3 can be enhanced further.

In addition, since the elastic projecting portions 60 are provided on the stem portion 40 which extends from the rear surface of the fixed flange 21, when the leg portion 30 is pulled out of the mounting hole 3 by moving the movable flanges 25, the elastic projecting portions 60 are prevented from being caught on the rear side of the mounting hole 3, making it easy to pull the elastic projecting portions 60 out of the mounting hole 3, whereby the reuse of the fastener 10 is facilitated by suppressing the deformation of the movable flanges 25.

Further, since the elastic projecting portions 60 are provided on the stem portion 40 which extends from the rear surface of the fixed flange 21, even though the elastic locking pieces 50 are deformed as a result of the movement of the movable flanges 25 in such a state that the leg portion 30 of the fastener 10 is inserted into the holding hole 7 in the mounted member 5 with the elastic projecting portions 60 left in temporary engagement with the rear side of the holding hole 7, the fastener 10 is not affected by the deformation of the elastic locking pieces 50, thereby making it possible to enhance the temporary holding force of the fastener 10.

Additionally, in this embodiment, as shown in FIG. 5, the stem portion 40 has the pair of shaft portions 41, 41 which are displaced from each other with respect to the center of the fixed flange 21, and the pair of elastic projecting portions 60, 60 are provided to project from the side surfaces 41b, 41b (refer to FIGS. 2B and 3) which are positioned opposite to the direction in which the shaft portions 41, 41 are displaced from each other with respect to the center of the fixed flange 21. Therefore, when the pair of elastic locking pieces 50, 50 are deflected to be deformed by collecting the pair of movable flanges 25, 25 together radially inwards of the fixed flange 21 to pull the leg portion 30 out of the mounting hole 3, the pair of elastic locking pieces 50, 50 can be prevented from interfering with the pair of elastic projecting portions 60, 60, thereby making it possible to improve the efficiency of the removing work of the fastener 10. In addition, the pair of elastic projecting portions 60, 60 can be constructed so as to project easily outwards of the stem portion from the portions positioned further inwards of the leg portion than the outer surface 41c of the leg portion 30.

Figure 11:
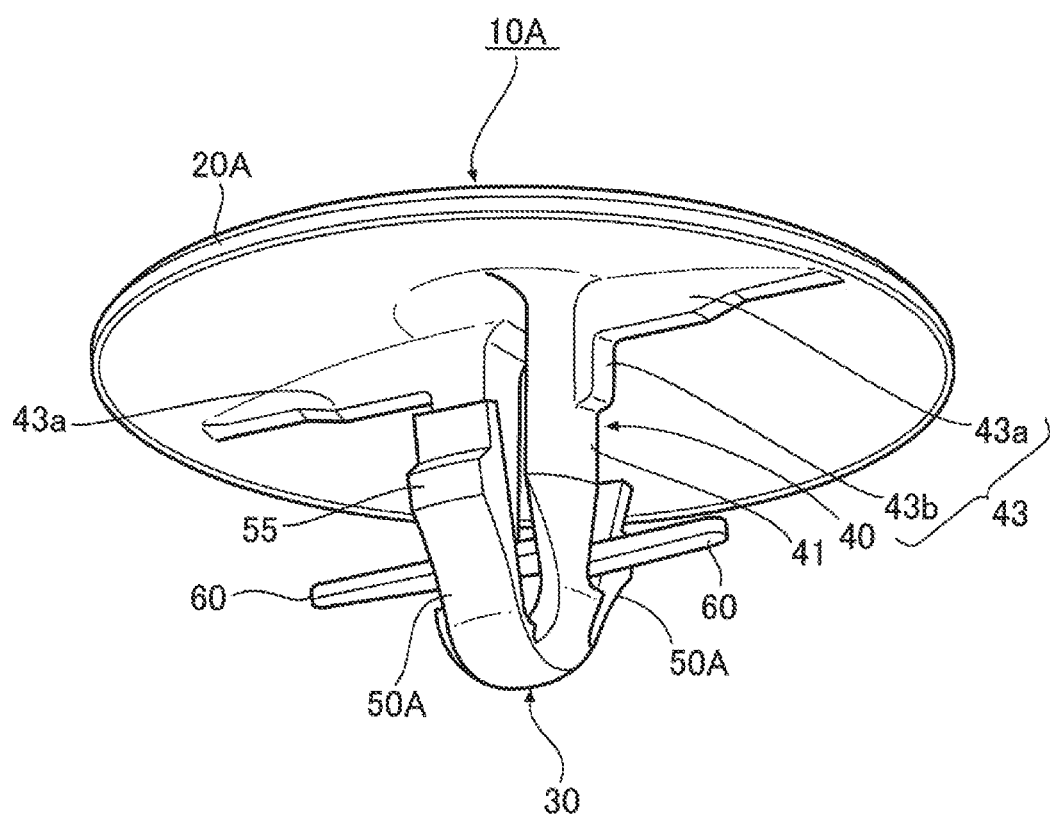
FIG. 11 is a perspective view showing another embodiment of a fastener of the invention.

FIG. 11 shows another embodiment of a fastener of the invention. Like reference numerals will be given to substantially like portions to those of the embodiment that has been described above, and a description thereof will be omitted herein.

As shown in FIG. 11, a fastener 10A of this embodiment differs from that of the embodiment that has been described above in the construction of a head portion 20A. Namely, the head portion 20A of this embodiment has no movable flanges 25, 25 and has a circular umbrella shape. A pair of elastic locking pieces 50A, 50A are formed into arms of an anchor and distal ends thereof are made into free ends.

In this fastener 10A of this embodiment, too, similar to that of the embodiment that has been described above, with engaging portions 55 of the elastic locking pieces 50A left in engagement with a rear side of a mounting hole 3, elastic projecting portions 60 are brought into abutment with an inner circumference of the mounting hole 3 to be bent, and a largest outside diameter defined by portions of the elastic projecting portions 60 which are positioned on the rear side of the mounting hole 3 is set to be equal to or smaller than a bore diameter of the mounting hole 3. This prevents the elastic projecting portions 60 from being caught on the rear side of the mounting hole 3 when pulling a leg portion 30 out of the mounting hole 3, thereby making it possible to improve the efficiency of removing work of the fastener 10A from the mounting hole 3.

The invention is not limited to the embodiments that have been described heretofore, and various modified examples can be made without departing from the spirit and scope of the invention, and the resulting embodiments will be included in the scope of the invention.

BRIEF DESCRIPTION OF REFERENCE NUMERALS

1 Mount Member
5 Mounted Member
7 Holding Hole
10, 10A Fastener
20, 20A Head Portion
21 Fixed Flange
22 Cut-Out Portion
25 Movable Flange
30 Leg Portion
40 Stem Portion 41 Shaft Portion
41a Distal End Portion
41b Side Surface
41c Outer Surface (Outer Surface of Leg Portion)
43 Restricting Portion
50, 50A Elastic Locking Piece
55 Engaging Portion
60 Elastic Projecting Portion

The invention claimed is:

1. A fastener configured to mount a mounted member on a mount member by being inserted into a holding hole formed in the mounted member and a mounting hole formed in the mount member, comprising:
   a head portion which is disposed on a front side of the mounting hole;
   a leg portion which extends from a rear surface of the head portion to be inserted into the holding hole and the mounting hole;
   an engaging portion which is provided on the leg portion to be brought into engagement with a rear side of the mounting hole; and
   an elastic projecting portion which projects outwards of the leg portion from a predetermined position on the leg portion for elastic deformation,
   wherein with the leg portion inserted in the holding hole and the engaging portion staying engaged with a rear side of the holding hole, the elastic projecting portion is disposed away from the holding hole,
   wherein with the leg portion inserted in the holding hole and the mounting hole and the engaging portion staying engaged with the rear side of the mounting hole, the elastic projecting portion is brought into abutment with an inner circumference of the mounting hole to thereby be bent, and a largest outside diameter of a portion of the elastic projecting portion which is positioned on the rear side of the mounting hole is set to be equal to or smaller than a bore diameter of the mounting hole.

2. The fastener according to claim 1, wherein the elastic projecting portion projects outwards of the leg portion from a portion which is positioned further inwards of the leg portion than an outer surface of the leg portion.

3. The fastener according to claim 1, wherein at least one of a rear side of the head portion and the leg portion is provided with a restricting portion configured to be brought into abutment with a circumferential edge of the mounting hole on the front side thereof to thereby restrict the leg portion from being inserted a predetermined amount or more into the mounting hole and wherein the elastic projecting portion is brought into abutment with the inner circumference of the mounting hole with the restricting portion left in abutment with the circumferential edge of the mounting hole on the front side thereof.

4. The fastener according to claim 1,
   wherein the head portion has a fixed flange having cut-out portions in a plurality of locations in a circumferential direction and a movable flange having a shape which substantially matches a shape of the cut-out portions,
   wherein the leg portion has a stem portion extending from a rear surface of the fixed flange and an elastic locking piece extending from a rear surface of the movable flange and having the engaging portion, and
   wherein the elastic projecting portion projects outwards of the stem portion from a predetermined position on the stem portion.

5. A fastener configured to be mounted by being inserted into a mounting hole, comprising:
   a head portion which is disposed on a front side of the mounting hole;
   a leg portion which extends from a rear surface of the head portion to be inserted into the mounting hole;
   an engaging portion which is provided on the leg portion to be brought into engagement with a rear side of the mounting hole; and
   an elastic projecting portion which projects outwards of the leg portion from a predetermined position on the leg portion for elastic deformation,
   wherein with the leg portion inserted in the mounting hole and the engaging portion staying engaged with the rear side of the mounting hole, the elastic projecting portion is brought into abutment with an inner circumference of the mounting hole to thereby be bent, and a largest outside diameter of a portion of the elastic projecting portion which is positioned on the rear side of the mounting hole is set to be equal to or smaller than a bore diameter of the mounting hole,
   wherein the leg portion has a shaft portion extending from the rear surface of the head portion,
   wherein the elastic projecting portion is provided with a recess portion on circumferences of a proximal end portion thereof and provided away from the shaft portion in a direction perpendicular to an axial direction of the shaft portion so as to be separated to be independent of the shaft portion in a cantilever fashion.

6. The fastener according to claim 5, wherein the elastic projecting portion projects outwards of the leg portion from a portion which is positioned further inwards of the leg portion than an outer surface of the leg portion.

7. The fastener according to claim 5, wherein at least one of a rear side of the head portion and the leg portion is provided with a restricting portion configured to be brought into abutment with a circumferential edge of the mounting hole on the front side thereof to thereby restrict the leg portion from being inserted a predetermined amount or more into the mounting hole and wherein the elastic projecting portion is brought into abutment with the inner circumference of the mounting hole with the restricting portion left in abutment with the circumferential edge of the mounting hole on the front side thereof.

8. The fastener according to claim 5,
   wherein the head portion has a fixed flange having cut-out portions in a plurality of locations in a circumferential direction and a movable flange having a shape which substantially matches a shape of the cut-out portions,
   wherein the leg portion has a stem portion extending from a rear surface of the fixed flange and an elastic locking piece extending from a rear surface of the movable flange and having the engaging portion, and
   wherein the elastic projecting portion projects outwards of the stem portion from a predetermined position on the stem portion.

9. A fastener configured to be mounted by being inserted into a mounting hole, comprising:
   a head portion which is disposed on a front side of the mounting hole;
   a leg portion which extends from a rear surface of the head portion to be inserted into the mounting hole;
   an engaging portion which is provided on the leg portion to be brought into engagement with a rear side of the mounting hole; and
   an elastic projecting portion which projects outwards of the leg portion from a predetermined position on the leg portion for elastic deformation, wherein with the leg portion inserted in the mounting hole and the engaging portion staying engaged with the rear side of the mounting hole, the elastic projecting portion is brought into abutment with an inner circumference of the mounting hole to thereby be bent, and a largest outside diameter of a portion of the elastic projecting portion which is positioned on the rear side of the mounting hole is set to be equal to or smaller than a bore diameter of the mounting hole, wherein the head portion has a fixed flange and a pair of movable flanges, wherein the leg portion has a stem portion extending from a rear surface of the fixed flange and elastic locking pieces respectively extending from rear surfaces of the pair of movable flanges and having the engaging portion, wherein the stem portion has a pair of shaft portions which extend from the rear surface of the fixed flange and the pair of shaft portions are shaped so that the shaft portions extend from positions on the fixed flange which are displaced from a center thereof to be connected to each other at distal end sides thereof, wherein the elastic projecting portion is made up of a pair of elastic projecting portions provided adjacently to the pair of shaft portions, and wherein when the pair of shaft portions and the pair of elastic projecting portions are seen from a direction along an axis of the leg portion, one of the elastic projecting portions projects outwards of the stem portion from a side surface of one of the shaft portions which is at an opposite side to the direction in which the one of the shaft portions is displaced from the center of the fixed flange and is disposed so as to face the other of the shaft portions with the engaging portion left in engagement with the rear side of the mounting hole, while the other of the elastic projecting portions projects outwards of the stem portion from a side surface of the other of the shaft portions which is at an opposite side to the direction in which the other of the shaft portions is displaced from the center of the fixed flange and is disposed so as to face the one of the shaft portions with the engaging portion left in engagement with the rear side of the mounting hole.

10. The fastener according to claim 9, wherein the elastic projecting portion projects outwards of the leg portion from a portion which is positioned further inwards of the leg portion than an outer surface of the leg portion.

11. The fastener according to claim 9, wherein at least one of a rear side of the head portion and the leg portion is provided with a restricting portion configured to be brought into abutment with a circumferential edge of the mounting hole on the front side thereof to thereby restrict the leg portion from being inserted a predetermined amount or more into the mounting hole and wherein the elastic projecting portion is brought into abutment with the inner circumference of the mounting hole with the restricting portion left in abutment with the circumferential edge of the mounting hole on the front side thereof.

* * * * *